UNITED STATES PATENT OFFICE.

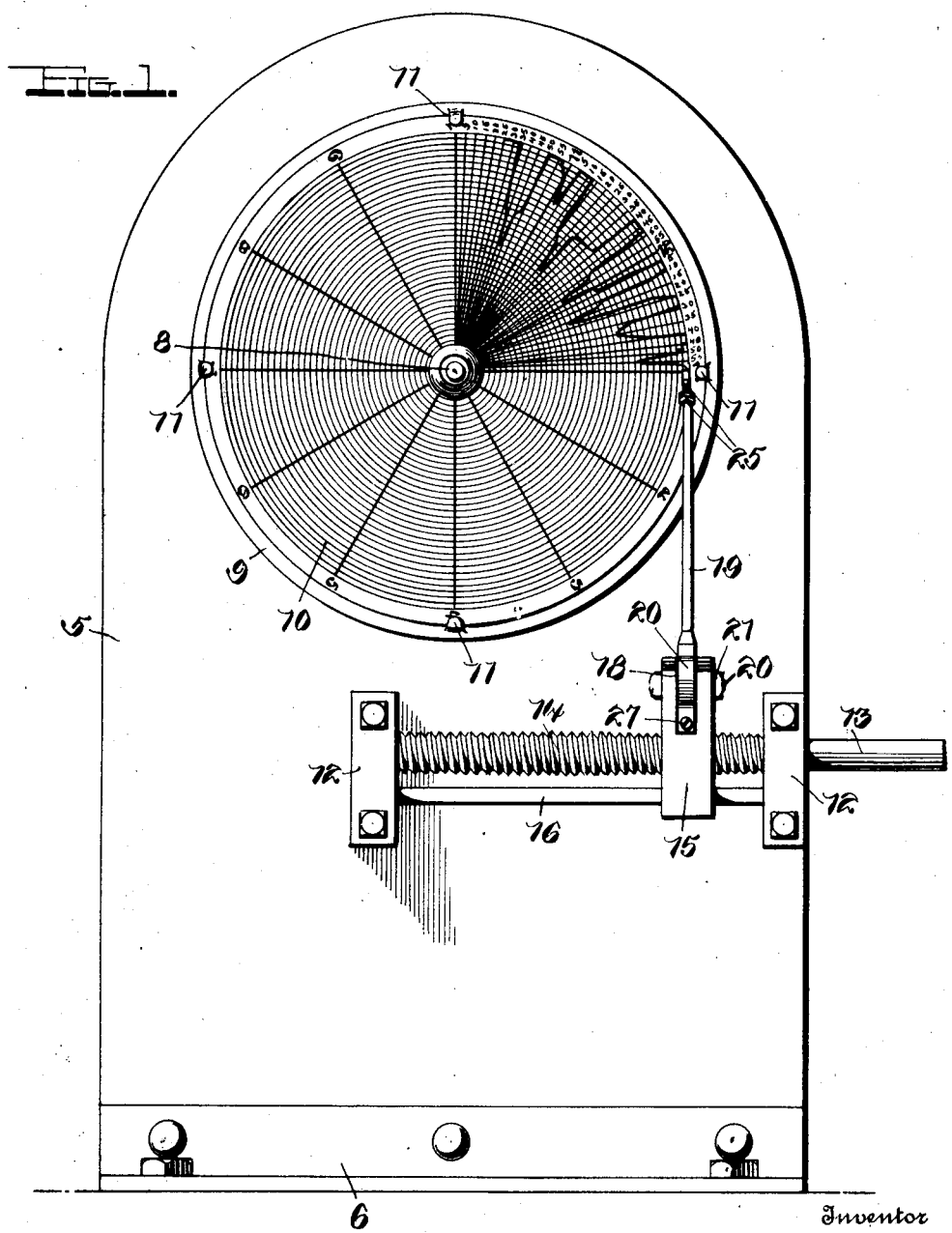

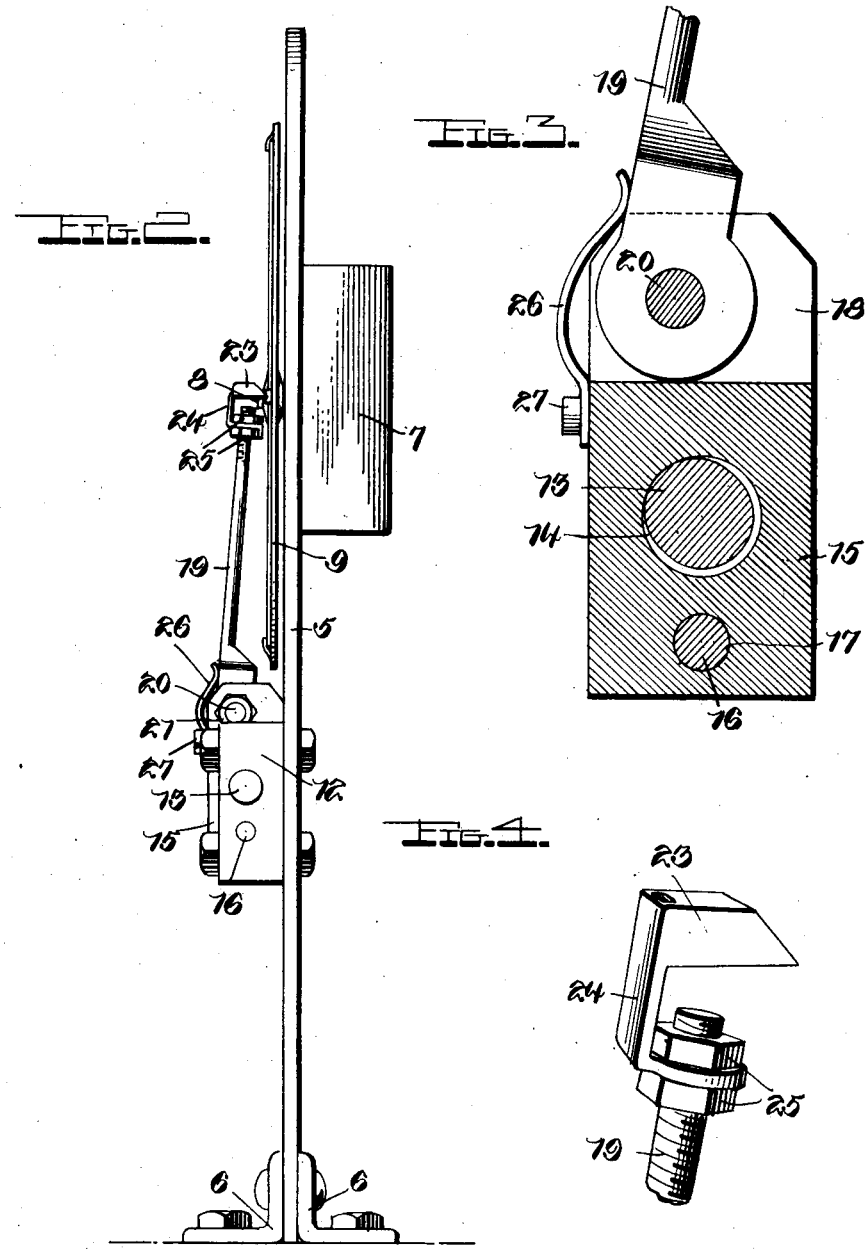

EDWIN F. SPEER, OF NEWCOMER, PENNSYLVANIA.

RECORDER.

999,412.   Specification of Letters Patent.   Patented Aug. 1, 1911.

Application filed February 7, 1911. Serial No. 607,216.

*To all whom it may concern:*

Be it known that I, EDWIN F. SPEER, a citizen of the United States, residing at Newcomer, in the county of Fayette and State of Pennsylvania, have invented certain new and useful Improvements in Recorders, of which the following is a specification, reference being had to the accompanying drawings.

This invention relates to recorders and has for its object to provide a haulage recorder of novel and simple construction which is primarily adapted for recording the time, delays, speed and location of the car or carrier at different points of its trip.

Another object of the invention resides in the provision of means for accurately determining the above facts and providing a permanent record of the same.

Still another object of the invention is to provide a recorder consisting of a rotatable chart and a movably mounted pen, said pen including means for regulating the pressure of the ink holder or pen point upon the chart.

With the above and other objects in view, the invention consists of the novel features of construction, combination and arrangement of parts hereinafter fully described and claimed, and illustrated in the accompanying drawings, in which—

Figure 1 is a side elevation of a recorder constructed in accordance with my invention; Fig. 2 is an edge view thereof; Fig. 3 is a section taken on the line 3—3 of Fig. 1; and Fig. 4 is a detail perspective view of the pen.

Referring in detail to the drawings 5 designates a vertical plate preferably of steel upon which the recording mechanism is mounted. This plate is rigidly fixed at its lower edge between the angle bars 6 which in turn are firmly secured to the floor or other base upon which the recorder is mounted.

Upon one side of the plate 5 adjacent to its upper end, a clock mechanism 7 of the ordinary construction is mounted, the arbor 8 upon which the hands are usually arranged projecting beyond the opposite face of the plate 5. Upon this arbor the disk 9 is fixed. On the disk 9 a chart 10 upon which the record is made is removably secured by means of the spring clips 11 formed upon the disk 9 adjacent to its edge. The chart 10 is provided with a central opening to receive the arbor 8 and has printed or otherwise marked thereon as shown in the drawings a plurality of spaced parallel circular lines and radial lines crossing said circular lines to mark the chart off into a large number of small squares. The space between each of the radials at the outer edge of the chart indicates five minutes and opposite each radial numerals are printed on the chart. In this manner the face of the chart is marked off to indicate twelve hours and as the recording pen moves over the surface of the chart the time which is required to make the trip and the speed and position of the car at different points in the trip are indicated by the line which is drawn upon the marked surface. The manner in which this record is made is as follows: Spaced bearing blocks 12 are rigidly fixed upon the plate 5 below the chart disk 9, and in these bearings a shaft 13 is rotatably mounted. This shaft is geared or otherwise connected to a haulage engine (not shown), and is rotated in the operation of said engine to take up or release the hauling cable. The shaft 13 between the bearing blocks 12 is screw threaded as indicated at 14 and upon this screw threaded portion of the shaft, a block 15 is arranged, said shaft having threaded engagement therein. A rod 16 has its ends rigidly fixed in the bearings 12 and the block 15 is provided with an opening 17 through which said rod is loosely disposed. This rod 16 prevents rotative movement of the block 15 with the shaft 13, whereby when the shaft is rotated the block 15 moves longitudinally thereon. The movable block 15 is bifurcated at one end as indicated at 18 to receive the end of the pen rod or shank 19 which is pivotally connected to said block by means of a bolt 20. This bolt is loosely disposed through the end of the pen rod and has a nut 21 threaded on one end thereof whereby the pen may be easily removed to be cleaned or repaired. The other end of the rod 19 is threaded as indicated at 22 and upon the same the ink reservoir or marking member 23 is arranged. This member is in the form of a small rectangular receptacle which has integrally formed therewith an angular arm 24. This arm is provided with an opening adjacent to one end to receive the threaded end of the rod 19. Nuts 25 are disposed upon the threaded portion 22 of the rod on opposite sides of the arm 24 and are adapted to clamp upon the same and rigidly fix the marker in position. It will be observed from reference to Fig. 2 that the rod 19 is disposed at a slight inclination with relation to the plane of the chart carrying disk. A leaf spring 26 yieldingly holds the rod 19 in such position and maintains the marker at all times in engagement with the chart. This spring is fixed at one end by means of a screw 27 to the movable block 15 and bears upon the rod 19 in advance of the bolt 20.

In the use of my improved recorder, the marker 23 is filled with ink or any other desired marking fluid which may be of any preferred color. Assuming that the device is in use for recording the trip of a mine car, the marker is positioned on the proper radial line of the chart which indicates the time at which the car starts upon its trip. As the car proceeds, the shaft 13 is rotated to move the block 15 upon the threaded portion thereof and thus cause the marker to move over the face of the chart. In this movement a line is drawn upon the chart over its checkered surface as indicated in Fig. 1 and at the same time as the chart rotates. This inward movement of the marker indicates the speed at which the car is moved and also by referring to the circular lines upon the chart, the location of the car may be determined. When the car reverses its line of movement the rotation of the shaft 13 will of course be reversed and the marker move outwardly toward the edge of the chart. The time which has been consumed in making the trip can be ascertained by reading the numerals between the ends of the line which have been drawn upon the chart.

From the above description it is thought that the construction and manner of operation of my improved recorder will be readily understood. By the use of the device, the time, location and speed of a car upon a level track or inclined plane may be automatically and accurately determined. The spring 26 at all times holds the marker on the end of the rod 19 in engagement with the chart, and the marking device itself is independently adjustable upon the end of the rod 19 so that the contact of the same with the chart surface is assured. Such an adjustment device is essential as the spring 26 will gradually decrease in strength and its efficiency will thus be impaired. The chart may at any time be easily and quickly removed and another substituted therefor. The device is extremely simple in construction so that a high degree of accuracy in practical use is maintained. Owing to the small number of elements employed it will also be obvious that the recorder can be manufactured at a small cost.

While I have shown and described the preferred construction and arrangement of the various parts, it will be understood that the device is susceptible of a great many minor modifications without departing from the essential feature or sacrificing any of the advantages thereof.

Having thus described the invention what is claimed is:—

In a device of the character described, the combination with a support and a rotatable chart mounted thereon, of bearings mounted upon said support, a shaft rotatably mounted in said bearings, said shaft having a threaded portion, a block longitudinally movable on the threaded portion of the shaft, a rod rigidly mounted at its ends in said bearings and disposed in the same plane as said shaft, said block having an opening therein to receive the rod and being movable thereon, a pen shank removably pivoted to said block, a marker adjustably secured upon the other end of said shank, and a leaf spring fixed at one end to the block and bearing upon said shank adjacent to its point of pivotal connection to the block to yieldingly hold the marker in engagement with the surface of the chart.

In testimony whereof I hereunto affix my signature in the presence of two witnesses.

EDWIN F. SPEER.

Witnesses:
 EDWARD P. GRAY,
 THOS. WELSH.

---

Copies of this patent may be obtained for five cents each, by addressing the "Commissioner of Patents, Washington, D. C."